Oct. 22, 1940.  W. H. VAN BENSCHOTEN  2,219,158
METHOD OF MANUFACTURE OF STEREOGRAMS
Filed Oct. 27, 1936  2 Sheets-Sheet 1
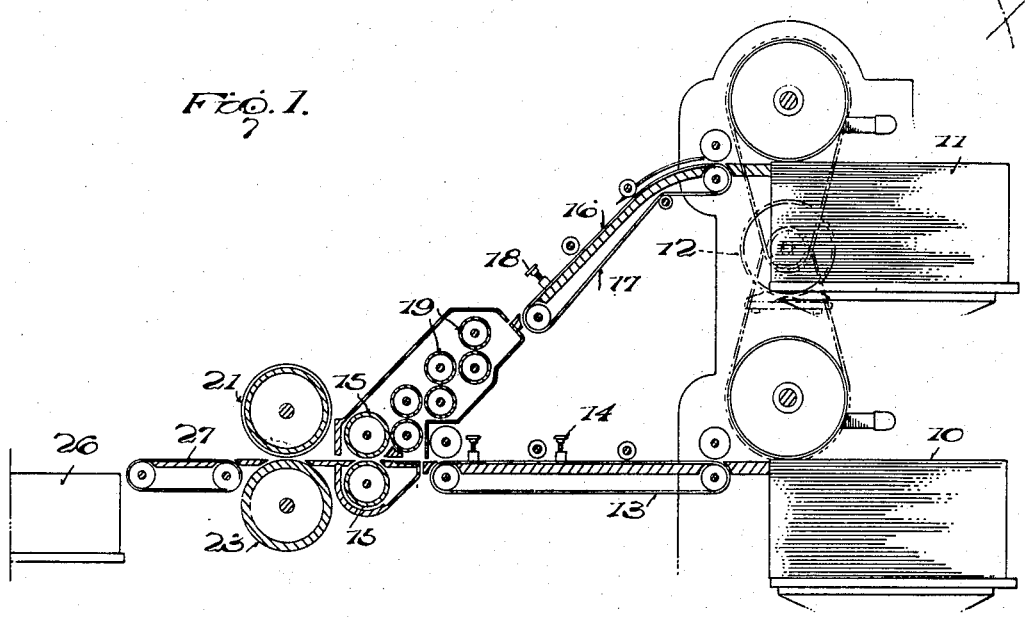
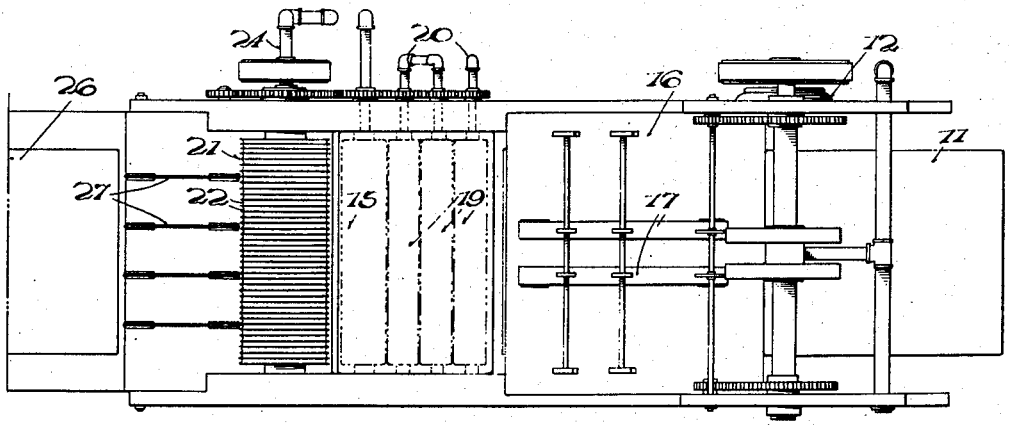
Inventor
William H. Van Benschoten Oct. 22, 1940.   W. H. VAN BENSCHOTEN   2,219,158
METHOD OF MANUFACTURE OF STEREOGRAMS
Filed Oct. 27, 1936   2 Sheets-Sheet 2
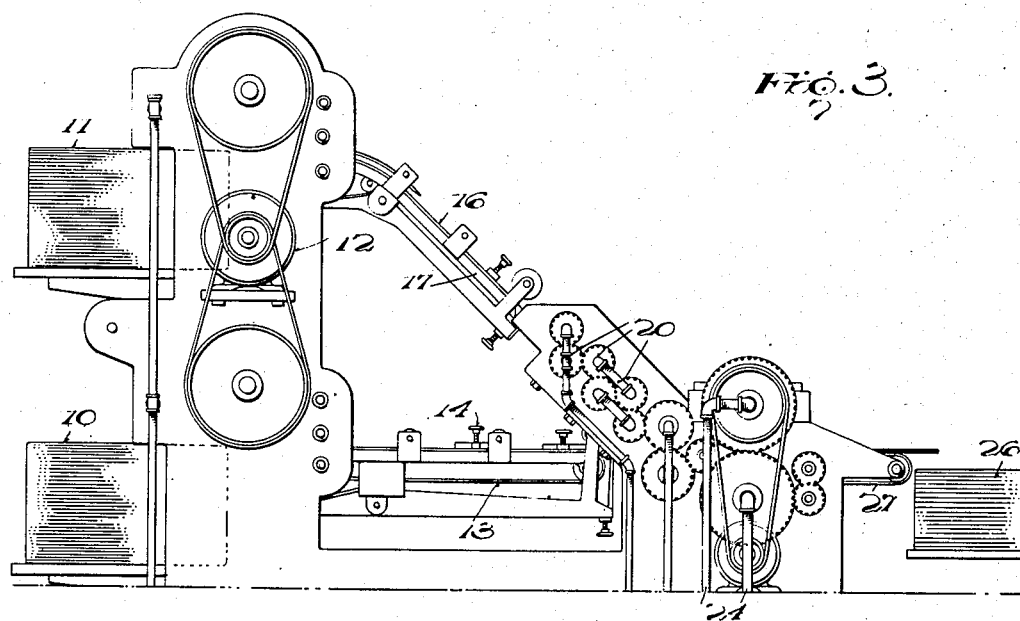
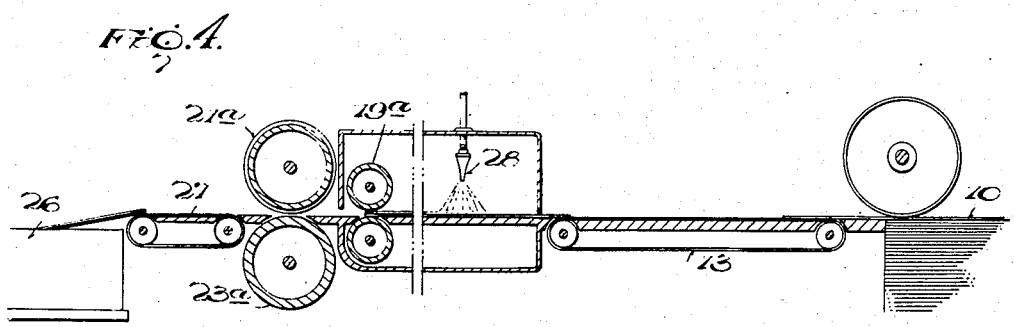
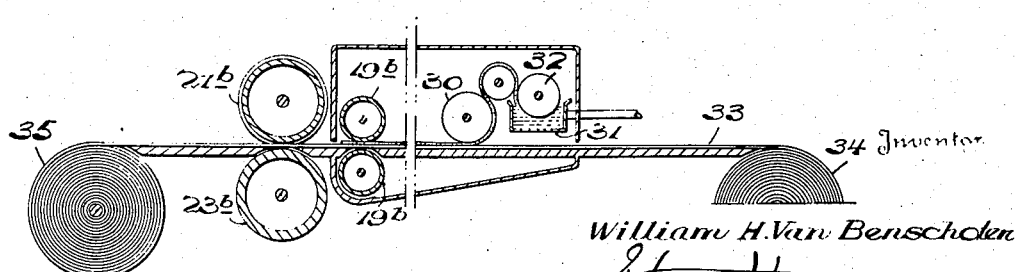
William H. Van Benschoten

UNITED STATES PATENT OFFICE 2,219,158

METHOD OF MANUFACTURE OF STEREOGRAMS

William Henry van Benschoten, Washington, D. C.

Application October 27, 1936, Serial No. 107,900

8 Claims. (Cl. 88—29)

My present invention relates generally to what are now more or less commonly known as stereograms and deals with the same as a product consisting of a sheet of material capable of bearing a composite picture of a pair of stereoscopic views disposed in narrow parallel and alternating strips, the picture surface being covered with a film-like transparent material having its upper surface formed in ridges paralleling and mating the picture strips, and forming cylindrical lens through which the composite views are coordinated in a single picture appearing to be in three dimensions.

I am aware there is nothing new in the above product and I am not concerned with the formation of the composite picture. This may be printed mechanically or photographically and upon any material suitable to the adherence therewith of a transparent material, such as cellulose acetate when such material is in a condition of plasticity wherein it may be impressed with lens ribs in the upper surface thereof.

My primary object is the provision of a method and means whereby to furnish the composite pictures with a properly placed and registered transparent film having a ribbed or ridged upper surface, in a manner to avoid the necessity for adhesives such as now used in the making of stereograms by hand, and to enable the speedy, economical and accurate production of stereograms. Up to the present time stereograms made by hand have previously ridged lens surface films affixed thereto with a transparent adhesive.

As distinguished from the above, my invention aims to manufacture stereograms on a commercial scale efficiently, speedily, economically and accurately, permitting their widespread use and enjoyment, and making possible realization of the great recreational, educational, scientific and commercial possibilities of this product.

For the above purposes, and in a general way, my invention proposes a method wherein the composite picture is covered with a layer of transparent film forming material in a sufficiently plastic condition to adhere to the picture sheet and then, while said material is still sufficiently plastic, simultaneously pressing the material into firm adhesion with the sheet and pressing ridges in the surface of the material or film to form the lens through which the picture strips of the composite picture appear as a single picture.

This method as thus generally outlined contemplates the picture sheet as already provided with the composite picture, although the film sheet may be either previously formed and applied as a sheet on the picture sheet or the film sheet formed on the picture sheet as a sprayed or otherwise applied coating. In either event it must, at the time the lens ribs are formed thereon, be in a soft condition.

My invention proposes both the method and apparatus for bringing about the desired result and in the detailed description to follow reference is made to the accompanying drawings illustrating the invention and forming a part of this specification, and wherein, Fig. 1 is a vertical sectional view through a proposed apparatus constituting one form of the invention.

Fig. 2 is a top plan view thereof.

Fig. 3 is a side view looking in the opposite direction with respect to Figure 1.

Fig. 4 is a side view, more or less diagrammatic, illustrating the application of the lens film by spraying, and, Fig. 5 is a similar view illustrating the lens film laid on by roller application.

Referring now to these figures and more particularly to Figure 1, I have shown a lower magazine 10 and an upper magazine 11 from which the uppermost sheets are fed in any suitable manner and by any suitable means, the operation of which is synchronized through suitable means as, for instance, a common operating motor 12.

Sheets with previously formed composite pictures of the nature I have set forth are fed from the lower magazine 10, along a horizontal feed table as, for instance, by a feed belt 13, between side aligning guides 14 of any suitable character so as to insure their delivery in properly oriented position and timed relation to a pair of hollow feed rolls 15.

Similarly sheets of transparent material, previously formed and cut, are fed from the upper magazine 11 downwardly along an inclined feed table 16 as by means of a feed belt 17, between suitable aligning guides 18 to the upper end of a series of hollow softening rolls 19 and to these rolls as well as the hollow feed rolls 15, steam or other suitable heating fluid is supplied through the pipes 20 shown in Fig. 3.

The series of softening rolls 19 are preferably arranged to cause a serpentine movement of the film sheets therethrough whereby to bring about maximum surface contact and thus maximum heating and softening influence, insuring a properly softened condition of the films when delivered from the lower end of the heating rolls to the heated feed rolls 15 in properly oriented position and properly timed relation for application to the corresponding picture sheets as the latter and the films pass in unison between the feed rolls 15 and from the latter immediately to the larger hollow press rolls beyond the feed rolls 15.

The press rolls just referred to comprise an upper ridging roll 21 having a multitude of circumferential grooves 22, each groove of a width corresponding to the desired widths of the lens ridges to be formed on the upper surfaces of the then softened films. The lower roll 23 has a smooth surface which receives the lower face of the picture sheets and it is obvious that as each picture sheet passes through the rolls 21 and 23, not only will the lens ribs be formed in the upper surface of the plastic film, but the latter will be firmly and uniformly pressed against the picture surface and a secure lasting contact between these parts will be brought about. Simultaneously with the pressure of the lens forming ribs or ridges in the plastic film, a cooling thereof is desirable to avoid danger of any collapse of the lens and to this end the hollow press rolls 21 and 23 are preferably supplied with cold water through the cold water pipes 24 seen in Fig. 3.

It is also preferable that the heating and softening rolls 19 as well as the heated feed rolls 15 be enclosed within a suitable casing 25, which will have the effect of retaining the heat, and it will be noted from Fig. 1 that this casing extends close to the press rolls 21 and 23 so that the picture sheets and their films will pass immediately through the press rolls from the casing.

After passage through the press rolls 21 and 23, the completed articles may be discharged into a receiving tray or box 26 by means of a conveyor 27.

It is obvious from the foregoing that my invention is not dependent upon, nor concerned with, the manner in which the picture sheets are provided with their composite pictures, but is concerned with the application of a transparent film thereto and the adhesion of said film as well as its surface ridging to create the necessary lens opposite to the picture strips of the picture sheet.

It must not be assumed that for the above purpose it is necessary, as previously described, to utilize previously formed film sheets for the carrying out of my improved method, however, since I may simply feed the picture sheets intermittently to a spray station where, as shown in Figure 4, the fluid material is sprayed on the picture sheets by a spray device 28. It is then possible the picture sheets coated in this manner may be immediately subjected to the action of the press rolls 21ª and 23ª, although it is more than likely they will present a better condition for pressure action if ample time is given for the evaporation of the solvent and they are passed between steam or otherwise heated rolls 19ª which will maintain the plastic coating in the properly soft condition necessary for the effective pressure ridging of the film by the rolls 21ª and 23ª.

It is also possible I may, instead of spraying on the coating film, apply the same directly, by roller application to the picture sheet, as seen in Figure 5. In this figure, the applying roll 30 takes its material from a suitable supply which may include a tank 31 and collecting cylinder 32, and the film may be continuously applied between heated rolls 19ᵇ to a continuous picture sheet or web 33 supplied from a feed roll 34 and subsequently wound upon a take-up roll 35. The structural details, apart from the ridging and pressing rolls, indicated in this figure at 21ᵇ and 23ᵇ, may, as in the other possible forms illustrated, be varied substantially at will. Any of the well-known mechanisms for feeding and registering printed matter in the art of color printing may be employed in the feeding and registration of the previously printed or photographically produced picture sheets, with respect to the transparent films and the means, of whatever nature, utilized to apply the same to the picture sheets, so as to insure complete and uniformly correct registration.

What is claimed is:

1. The method of manufacturing stereograms which comprises providing a picture sheet having thereon a composite image consisting in pairs of stereoscopic views disposed in narrow parallel alternating strips, applying to said sheet a film of transparent material, thereafter while the film is in a plastic state, forming therein lens ridges in the surface of the film by a pressure means grooved to conform to the full contours of the lens ridges and thereby applying uniformly effective pressure over the entire surface of the ridged film for forcing the latter into uniformly flat even adherence with the picture sheet, and guiding the film-coated sheet to the said pressure means in a manner to insure formation of the lens ridges parallel to the picture strips of the image and in definite positional relationship therewith resulting in stereoscopic view of the image from a predetermined position substantially opposite the center of the image.

2. The method of manufacturing stereograms which comprises providing a picture sheet having thereon a composite image consisting in pairs of stereoscopic views disposed in narrow parallel alternating strips, securing to said sheet a film of transparent plastic material having a plain surface, and thereafter applying pressure to the film, while the film is in a plastic state, in a manner to form lens ridges in the surface of the film parallel to the picture strips and in definite positional relationship therewith resulting in stereoscopic view of the image from a predetermined position substantially opposite the center of the image.

3. The method of manufacturing stereograms which comprises providing a picture sheet having thereon a composite image consisting of pairs of stereoscopic views disposed in narrow parallel alternating strips, securing to said sheet a film of transparent plastic material having a plain surface, and thereafter applying pressure to the film while the film is in a plastic state, in a manner to bring about close uniform adhesion of the film with the picture sheet and at the same time form lens ridges in the surface of the film parallel to the picture strips and in definite positional relationship therewith resulting in stereoscopic view of the image from a predetermined position substantially opposite the center of the image.

4. The method of manufacturing stereograms which comprises providing a picture sheet having thereon a composite image consisting in pairs of stereoscopic views disposed in narrow parallel alternating strips, securing to said sheet a film of transparent plastic material having a plain surface, thereafter rolling lens forming ridges in the surface of the film while in a plastic state, and guiding the film-coated sheet to the rolls in a manner to insure formation of the lens ridges parallel to the picture strips of the image and in definite positional relationship to said strips resulting in stereoscopic view of the image from a predetermined position substantially opposite the center of the image.

5. The method of manufacturing stereograms which comprises providing a picture sheet having thereon a composite image consisting in pairs of stereoscopic views disposed in narrow parallel alternating strips, spraying a film of transparent material on said sheet to cover the composite image with a film coating having a plain surface, and rolling lens forming ridges in the surface of the applied film, while the latter is in a plastic state, in a manner to form lens ridges in the surface of the film parallel to the picture strips and in definite positional relationship therewith resulting in stereoscopic view of the image from a predetermined position substantially opposite the center of the image.

6. The method of manufacturing stereograms which comprises providing a picture sheet having thereon a composite image consisting in pairs of stereoscopic views disposed in narrow parallel alternating strips, applying to the picture sheet a heated layer of transparent plastic material in the nature of a film covering the composite image and presenting a plain surface, and thereafter rolling lens forming ridges in the surface of said film, while in a plastic state, parallel to the picture strips and in definite positional relation therewith resulting in stereoscopic view of the image from the predetermined position substantially opposite the center of the image.

7. The method of manufacturing stereograms which comprises providing a picture sheet having thereon a composite image consisting in pairs of stereoscopic views disposed in narrow parallel alternating strips, depositing by roller application a film of transparent material in a plastic state on said picture sheet to cover the composite image, and present a plain surface, and thereafter rolling lens forming ridges in the plain surface of the film, while the film is in a plastic state, parallel to the picture strips and in definite positional relationship therewith resulting in stereoscopic view of the image from a predetermined position substantially opposite the center of the image.

8. The method of manufacturing stereograms which comprises first producing a composite image consisting of a pair of stereoscopic views arranged on a sheet in parallel alternating picture strips, second, applying to said sheet a film of transparent plastic material so as to cover the several picture strips of the image, and third, forming the upper surface of the applied film by pressure means grooved to produce lens ridges over the entire surface of the film above the picture strips, while at the same time guiding the image and pressure means relative to one another whereby to position the lens ridges in parallel registry with the picture strips of the image and conforming the width relationship of the lens ridges to the picture strips whereby the registry of the lens ridges and strips is such as to cause the composite image to have stereoscopic character when viewed from predetermined viewpoints.

WILLIAM H. van BENSCHOTEN.